United States Patent [19]

Lurie et al.

[11] Patent Number: 5,656,814
[45] Date of Patent: Aug. 12, 1997

[54] VERSATILE METHOD AND DEVICE FOR THERMOLUMINESCENCE COMPARATIVE ANALYSIS

[75] Inventors: Alexander Lurie, Nesher; Gregory Fogel, Kiryat Motzkin; Boris Volfson, Haifa, all of Israel

[73] Assignee: TSL Industrial Instruments Ltd., Misgav, Israel

[21] Appl. No.: 598,450

[22] Filed: Feb. 8, 1996

[30] Foreign Application Priority Data

May 29, 1995 [IL] Israel ......................................... 113907

[51] Int. Cl.⁶ .............................. G01T 1/11; G01T 1/115
[52] U.S. Cl. ........................................ 250/337; 250/484.3
[58] Field of Search .................................. 250/337, 484.3

[56] References Cited

U.S. PATENT DOCUMENTS

| | | | |
|---|---|---|---|
| 3,376,416 | 4/1968 | Rutland et al. | 250/337 |
| 3,823,323 | 7/1974 | Jones et al. | 250/337 |
| 3,852,589 | 12/1974 | Chenault et al. | 250/337 |
| 4,220,856 | 9/1980 | Fisher et al. | 250/337 |
| 4,882,488 | 11/1989 | Hashiue | 250/337 |
| 4,994,662 | 2/1991 | Funahashi et al. | 250/337 |
| 4,999,504 | 3/1991 | Braunlich et al. | 250/337 |
| 5,136,163 | 8/1992 | Miller et al. | 250/337 |
| 5,500,529 | 3/1996 | Tawil et al. | 250/337 |

FOREIGN PATENT DOCUMENTS

WO87/04528 of 1987 WIPO.

OTHER PUBLICATIONS

Willhoit, D.G. et al, "Thermoluminescent Characteristics of Irradiated Enamel and Dentin", Health Physics, vol. 15, pp. 91–93 (1968).

Sekharan, P.C. et al, "Application of Thermoluminescence in Forensic Science", Int. Proc. Natl. Symp. on Thermoluminescence and Applications Kalpakkam, Madras, India 12–15 Feb., 1975, pp. 638–648.

Mahesh, K. "Thermoluminescence in Solids and Its Applications", Nuclear Technology Publishing, Chap. 8, (1989).

Mills, A. A., Apparatus for the Measurement of Thermoluminescence, Journal of Physics E: Scientific Instruments, vol. 10, pp. 51–56 1977.

*Primary Examiner*—Michael J. Tokar
*Assistant Examiner*—Virgil O. Tyler
*Attorney, Agent, or Firm*—Mark M. Friedman

[57] ABSTRACT

Versatile method and device of thermoluminescence analysis are provided. Such a method and device can be applied to: exploration of petroleum, natural gas and minerals; forensic examination of objects; environmental monitoring; and production quality control. The device includes: a heating element; an optical readout system; and a rotating disk with openings for passage of light emitted by a heated sample. The device further includes a reference light source for controlling the optical readout system, and a computer system for controlling the operation of said device and for data storage, retrieval and processing. The method includes the steps of: (a) extracting reference and analysed samples for analysis; (b) performing thermoluminescence analysis, including the steps of: (i) heating a sample and recording a thermoluminescence curve associated with a natural irradiation; (ii) irradiating the sample; and (iii) heating the sample and recording a thermoluminescence curve associated with the artificial irradiation; (c) performing a comparative analysis of the thermoluminescence curves associated with natural and artificial irradiation of the reference and analysed samples; and (d) making a conclusion.

66 Claims, 7 Drawing Sheets

I

II

VERSATILE METHOD AND DEVICE FOR THERMOLUMINESCENCE COMPARATIVE ANALYSIS

FIELD AND BACKGROUND OF THE INVENTION

The present invention relates to methods of thermoluminescence analysis and, more particularly, to versatile method and device for determining physico-chemical properties of materials using thermoluminescence analysis, which can be applied to geology, forensic science, industry and other branches of human activities. Examples of such applications may be: exploration of petroleum, natural gas, and minerals; forensic examination of objects; detection of environmental pollution; and production quality control.

The thermoluminescence phenomenon (TL) occurs widely in nature. TL occurs in a great number of various materials such as natural minerals, solid organic substances such as bones or fish's scale, and various rocks such as calcite, dolomite, feldspars, quartz and zircon. Physical processes underlying the thermoluminescence of solids are essentially well studied. The natural or artificial irradiation excites electrons from the valence band of a solid knocking them free from bonded (local) states. Most of the excited electrons return to the valence band after a short time producing a light emission (luminescence). Some of them, however, are trapped in local trapping levels within the forbidden band. Each electron coming out of the valence band leaves a hole in this band which may be as well trapped in a corresponding level within the forbidden band. These trap levels are usually associated with lattice defects, such as vacancies or impurities. The electron trapping levels are called traps, and those of hole trapping are called recombination centers.

Trapped (localized) charge carriers, electrons and holes, can remain in this state for a very long time at room temperature or below. However, at elevated temperatures (when heated) these charge carriers, such as localized electrons are released from the trap and, freely moving in the crystal, may recombine with holes trapped in recombination centers. If those recombinations are accompanied by light emission, thermoluminescence is observed, the properties of which largely depend on previous radiation and the physical and chemical conditions in which the sample was before.

The use of thermoluminescence (TL) for analyzing physico-chemical properties of materials is well established, see for example, S. W. S. McKeever "Thermoluminescence of Solids", Cambridge, Solid State, Science Series, Cambridge University Press, 1985.

Various attempts have been made to develop accurate and efficient methods and devices for determining the physico-chemical properties of materials using thermoluminescence analysis.

Prior art includes various methods and devices applicable to geology and mineralogy, such as methods and devices for studying meteorites, stalactites and volcanic rocks, and for dating and identification of archeological materials. Examples are disclosed in: S. W. S. McKeever "Thermoluminescence of Solids", Cambridge, Solid State, Science Series, Cambridge University Press, 1985. However, the main drawback of such methods and devices is that they are designed for a specific purpose, such as dosimetry, and therefore their use is relatively limited and expensive.

Further prior art includes methods and devices applicable to environmental monitoring, such as methods and devices for detecting local radioactive contaminations. Examples are disclosed in: Wachsmann F. and Regulla D. F. Kemtechnik 7, 318, 1978; Wachsmann F. and Regulla D. F. Proc. Syrup on the Natural Radiation Environment, Houston, 23–28 Apr. 1978, eds. T. F. Gesell and W. M. Lowder, Vol. 2, p. 1022, (US DOI, Washington, 1980). Such method is based on the use of a set of detectors positioned at the site of supposed contamination. Deviations from the radioactivity background in the detector's readings indicate that there is radioactive contamination in the area. To carry out the method, thermoluminescent dosimeters are used which are specified for a certain set of detectors. However, such methods and devices are ineffective. Further, they are limited to a specific purpose and do not allow, for example, the detection of non-radioactive substances.

Additional prior art includes methods and devices applicable to exploration of petroleum and minerals. An example, which is the closest to the claimed invention, is disclosed in PCT Application No. WO 87/04528. Such method includes thermoluminescence analysis of a crystalline sample, such as feldspar or quartz, for determining the proximity of the sample to a mineral or petroleum deposit. The method comprises first irradiating the sample with gamma-radiation. Thereafter irradiated samples are heated from an ambient temperature to an elevated temperature. Then their thermoluminescence intensities are measured at different temperatures and the thermoluminescence curves are related to thermoluminescence intensities of reference samples having known characteristics indicative of the proximity of explored minerals or petroleum. The samples may be previously treated to remove unwanted accessory minerals, such as feldspar and zircon, and shielded from direct light to allow phosphorescence and radioluminescence to decay.

However, the main drawback of this method is in the necessity to always irradiate samples before taking thermoluminescence curves which may hide the natural distribution of the radioactivity background in the analyzed area and, hence, necessary and significant information may be lost when making a conclusion on the presence or absence of explored petroleum or natural gas. Another drawback is the preparation of reference samples from materials subjected to different degrees of physical action (a certain dose of irradiation). Thus, in relating the analyzed samples to reference samples, only the intensity difference of certain TL peaks is studied. This excludes the evaluation of petroleum and natural gas influence on other physico-chemical properties of the samples causing the appearence of additional TL peaks or disappearence of old peaks thereof.

Finally, most of the disclosed methods and devices of TL-analysis are ineffective, inefficient, limited to a specific purpose, expensive, and require some special training of the investigator.

There is thus a widely recognized need for, and it would be highly advantageous to have, methods and devices of thermoluminescence analysis which are applicable to various purposes such as: exploration of petroleum, natural gas and minerals; forensic examination of materials, substances and articles; environmental monitoring; and production quality control.

It would be further advantageous to have such methods and devices which allow a simultaneous detection of different factors, such as changes in the chemistry and radioactivity of a soil sample, for predicting an earthquake.

Also it would be advantageous to have such methods and devices which are: effective and accurate; capable of detecting, retaining and processing relevant information; convenient for ready use by untrained personnel; efficient and inexpensive.

SUMMARY OF THE INVENTION

According to the present invention there is provided a device for thermoluminescence analysis, comprising: (a) a heating element; (b) an optical readout system; and (c) a rotating disk.

The heating element may include a depression for mounting a compartment with a sample, and a thermocouple for controlling the level of heating. The optical readout system may include a filter and a photomultiplier. The rotating disk may include an independent drive, and openings for passage of light emitted by a heated sample. The rotating disk is preferably positioned between the heating element and the photomultiplier.

According to further features in preferred embodiments of the invention described below, the device also includes a reference light source for controlling the optical readout system by normalizing the light emitted by a heated sample to the reference light source. The reference light source may preferably be positioned on the rotating disk between the openings.

According to another embodiment the reference light source is positioned at the side of the rotating disk and the photomultiplier, and the rotating disk is provided with a means for transmitting light from the reference light source to the photomultiplier, such as a mirror or a fiber-optic system.

According to still further features in the described preferred embodiments, the control of the optical readout system may be done by continuous normalization of light emitted by the sample to the reference light source.

According to another embodiment the control of the optical readout system may be done by periodic normalization of light emitted by the sample to the reference light source.

Also according to the present invention there is provided a method of thermoluminescence analysis, comprising the steps of:

(a) extracting samples for thermoluminescence analysis, including: (i) reference samples; and (ii) analysed samples;

(b) performing thermoluminescence analysis for each sample, the analysis including the steps of: (i) mounting a compartment with a sample on the heating element of a device according to the present invention; heating the sample from an ambient temperature to an elevated temperature; and recording a thermoluminescence curve associated with a natural irradiation; (ii) irradiating the sample with a dose of artificial ionizing irradiation; and (iii) mounting a compartment with an irradiated sample on the heating element of a device according to the present invention; heating the sample from an ambient temperature to an elevated temperature; and recording a thermoluminescence curve associated with the artificial ionizing irradiation.

(c) performing a comparative analysis of the resulted curves, the analysis including the steps of: (i) comparing the thermoluminescence curves associated with the natural irradiation of the reference and the analysed samples; (ii) comparing the thermoluminescence curves associated with the artificial irradiation of the reference and the analysed samples; (iii) comparing the thermoluminescence curves associated with the natural and the artificial irradiation of the reference and analysed, samples; and (d) making a conclusion according to the results of the comparative analysis.

According to further features in preferred embodiments of the invention, the extraction of samples may comprise the steps of: (a) determining an area for sample analysis; (b) determining sampling points within and outside the area, the points arranged in a certain manner; (c) plotting the sampling points on a diagram; (d) extracting, packaging and marking analysed samples from the sampling points within the area; and (e) extracting, packaging and marking reference samples from the sampling points outside the area.

The strategy of extracting samples for analysis may be defined by the dimensions and shape of the area, and by the type and specifies of the problem being solved. The extracted samples may immediately be packaged in special containers wherein they are shielded from light. The containers may preferably be stored at a predetermined temperature, not subjected to artificial ionizing irradiation, until the analysis begins.

According to still further features in the described preferred embodiments, the samples may preferably consist of fine fractions. The samples are preferably analysed in a pre-determined spectral range. The air in the device is preferably replaced with a nitrogen or an inert gas. The dose of ionizing irradiation is preferably pre-determined.

According to another embodiment, the samples may consist of coarse fractions. Such samples are preferably weighed before heating, and the obtained thermoluminescence curves are normalized to the sample mass value. In addition, the compartment is preferably filled with a low melting point alloy, to improve thermal contact.

According to additional features in the described preferred embodiments, a conclusion is made according to the specific application of the method, and the problem being solved.

When the method is used for exploration of a substance, a substantial difference between the thermoluminescence curves of the analysed samples and reference samples indicates the presence of the substance sought for in the explored erea.

When the method is used for identification of objects, an overlapping of the thermoluminescence curves of the analysed samples and reference samples indicates that all samples belong to the same batch.

A conclusion may further be made according to a computer library of reference thermoluminescence curves having known features.

The present invention successfully addresses the shortcomings of the presently known configurations by providing method and device of thermoluminescence comparative analysis which are applicable to various purposes such as: exploration of petroleum, natural gas and minerals; forensic examination of materials, substances and articles; environmental monitoring; and production quality control. Such method allows a simultaneous detection of different factors, such as changes in the chemistry and radioactivity of a soil sample, thereby predicting the occurrence of an earthquake.

Contrary to the presently known configurations, the method is effective and accurate, capable of detecting and retaining relevant information, convenient for ready use by untrained personnel, efficient and inexpensive.

While the invention is used as a method for exploration of petroleum, natural gas or minerals, the samples are preferably collected as particles of hard rocks such as sand, earth and stones extracted from the subsurface which has not been subjected to anthropogenic action. A conclusion is made according to the following criteria: (a) when the thermoluminescence curves associated with the natural irradiation of the analysed samples substantially differ from those of the reference samples, a preliminary conclusion is made on the presence of petroleum, natural gas or minerals in the explored area; (b) when the thermoluminescence curves associated with the natural irradiation of the analysed samples coincide with those associated with the artificial irradiation and with geophysical prospect data, a final conclusion is made on the presence of petroleum, natural gas or minerals in the explored area.

While the invention is used as a method for forensic examination of materials, substances and articles, a conclusion is made according to the following criteria: when the thermoluminescence curves associated with the artificial irradiation of the analysed samples coincide with those of the reference samples, a conclusion is made that the samples belong to the same batch.

While the invention is used as a method for monitoring of environmental pollution, the samples are preferably collected as particles of hard rocks, such as sand, earth and stones, extracted from the upper soil layer. A conclusion is made according to the following criteria: when the thermoluminescence curves associated with the natural and artificial irradiation of the analysed samples substantially differ from those of the reference samples, a conclusion is made on the presence of environmental pollution in the examined area.

While the invention is used as a method for quality control, a conclusion is made according to the following criteria: when the thermoluminescence curves associated with the artificial irradiation of the analysed samples coincide with those of the reference samples, a conclusion is made on the absence of impurity or structural defects in the analysed material.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a versatile method of thermoluminescence comparative analysis which can be applied to various purposes, such as: exploration of petroleum, natural gas and minerals; forensic examination of materials, substances and articles; environmental monitoring; and production quality control. Such method allows a simultaneous detection of different factors, such as changes in the chemistry and radioactivity of a soil sample, for predicting an earthquake.

Methods according to the present invention allow scientists and untrained personnel to conduct thermoluminescence analyses more efficiently and accurately then heretofore possible.

The principles and operation of a method according to the present invention may be better understood with reference to the drawings and the accompanying description.

Figure 1:
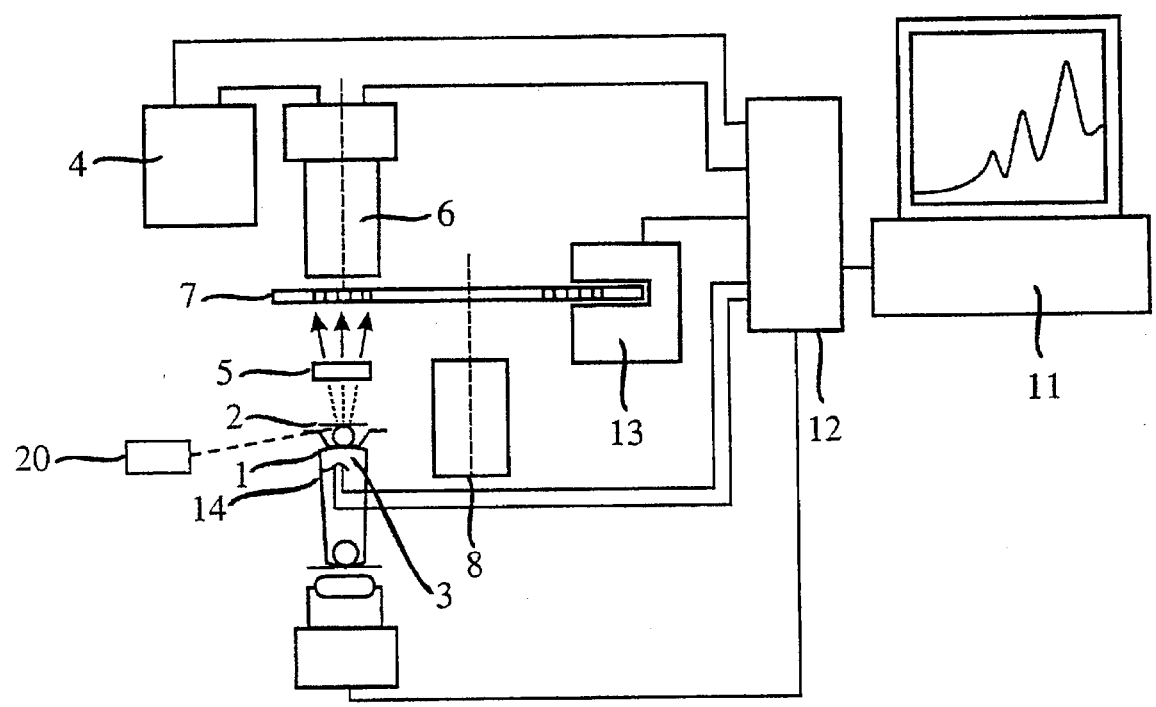
FIG. 1 shows a block diagram of a device for thermoluminescence analysis according to the present invention.
Figure 2:
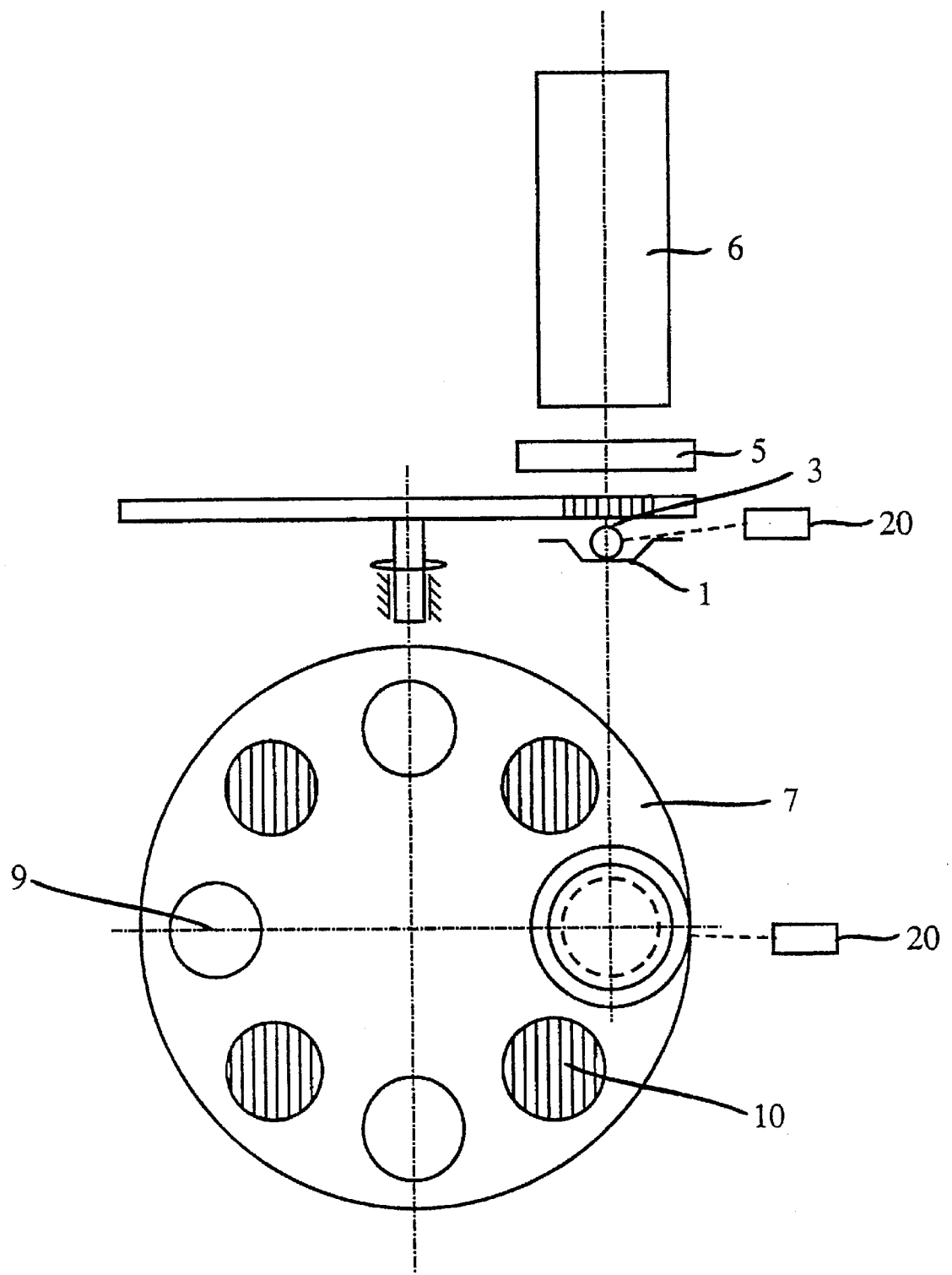
FIG. 2 is a schematic side view and a pertinent top view of an embodiment wherein the reference light source is positioned on the rotating disk.
Figure 3:
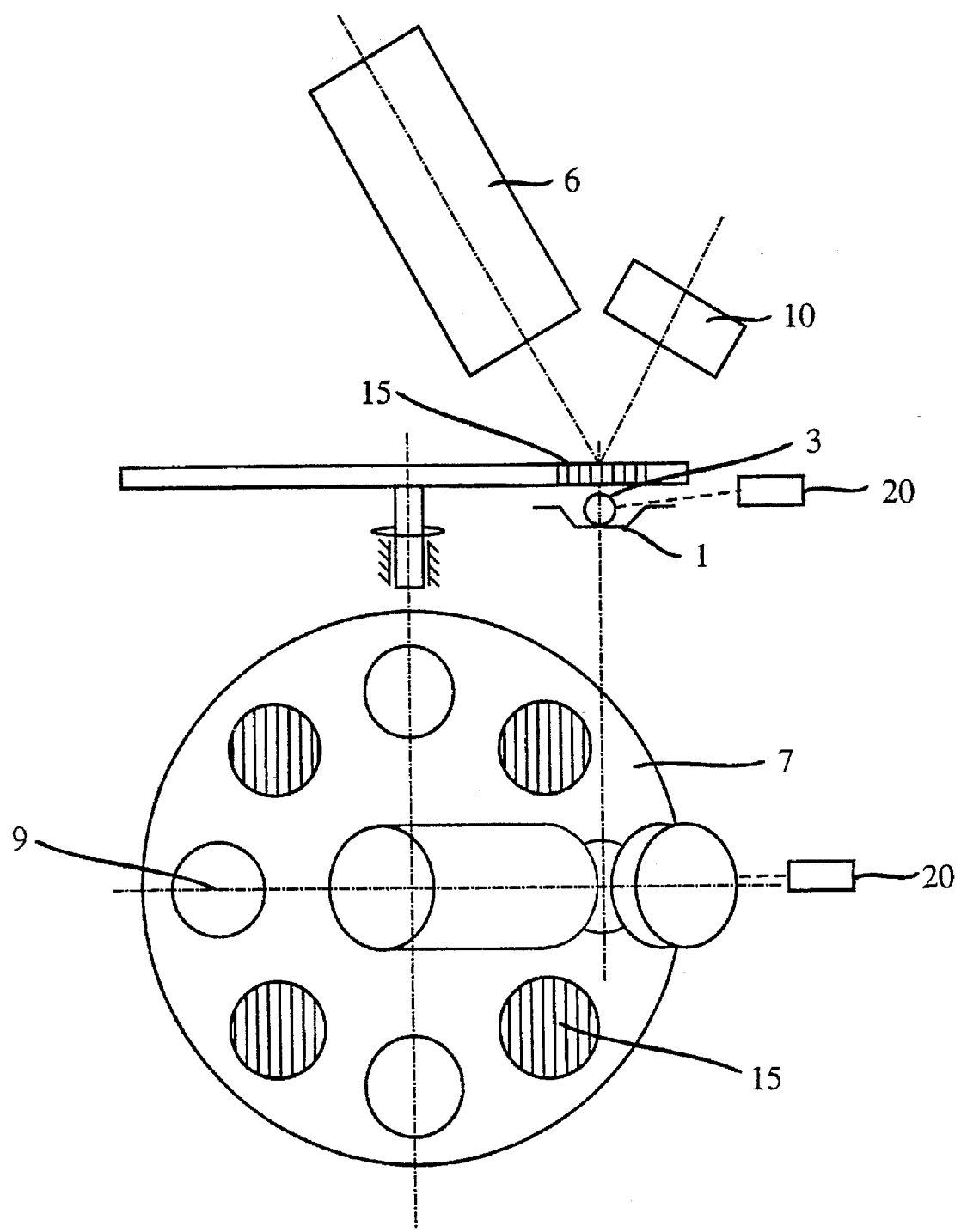
FIG. 3 is a schematic side view and a pertinent top view of an embodiment wherein the reference light source is positioned at the side of the rotating disk.

Referring now to the drawings, FIGS. 1–3 illustrate a device of thermoluminescence analysis according to the present invention. The device includes a heating element 1 for heating a compartment 2 with a sample 3, an optical readout system 4 for receiving light emitted by sample 3, and a rotating disk 7 for alternately chopping light emitted by sample 3. Heating element 1 preferably includes a depression for mounting compartment 2 with sample 3. Further, heating element 1 preferably includes a thermocouple 14 for controlling the level of heating. Compartments 2 are preferably of known and identical emission spectra. Optical readout system 4 preferably includes a filter 5 and a photomultiplier 6. Rotating disk 7 preferably includes an independent drive 8, and openings 9 for passage of light. Rotating disk 7 is preferably located between heating element 1 and photomultiplier 6, so that light emitted by sample 3 arrives to photomultiplier 6 through openings 9 of rotating disk 7.

As shown in FIGS. 1–3, the device further includes a reference light source 10, for controlling optical readout system 4. As shown in FIG. 2, reference light source 10 may preferably be located on rotating disk 7 between openings 9.

Another possible configuration is shown in FIG. 3, where reference light source 10 is positioned at the side of rotating disk 7 and photomultiplier 6. In this configuration, rotating disk 7 is provided with a means for transmitting light from reference light source 10 to photomultiplier 6, for example, in the form of a mirror 15 or a fiber optical system.

The control of optical readout system 4 may preferably be continuous, and may be done by continuous normalization of the intensity of light emitted by sample 3 to the intensity of light emitted by reference light source 10. Alternatively, the control of optical readout system 4 may be periodic, and may be done by periodic normalization of the intensity of light emitted by sample 3 to the intensity of light emitted by reference light source 10.

As shown in FIGS. 1–3, the device further includes a computer system 11 for controlling the operation of said device, and for data storage, retrieval and processing. Computer system 11 is preferably connected with the mentioned elements via a convertor 12 and an optical convertor 13. Convertor 12 is preferably connected with heating element 1 and thermocouple 14 for controlling the level of heating.

A device according to the present invention operates as follows (FIGS. 1–3). Compartment 2 with sample 3 is mounted on heating element 1. Under a given program convertor 12 actuates the electric circuit of heating element 1 and controls the level of heating by means of thermocouple 14. Then thermoluminescence is recorded. The light emitted by heated sample 3 passes at equal time intervals through openings 9 in rotating disk 7 and gets via filter 5 to photomultiplier 6 and optical readout system 4 where it is recorded, and the obtained electric signal gets via convertor 12 to computer system 11.

In the time lapses when the light from sample 3 is cut off by rotating disk 7, the light from reference light source 10, which is positioned on rotating disk 7 (FIG. 2), arrives to photomultiplyer 6 and optical readout system 4 where it is recorded, and the obtained electric signal gets via convertor 12 to computer system 11.

According to the configuration shown in FIG. 3, wherein reference light source 10 is positioned at the side of rotating disk 7, reference light source 10 is optically connected during said time lapses with photomultiplier 6 via mirror 15 which is positioned on rotating disk 7 between openings 9. Alternatively, reference light source 10 is optically connected during said time lapses with photomultiplier 6 via an optic fibre (not shown in the drawings).

The intensity values of light emitted by sample 3 are continuously or periodically normalized to the intensity values of light emitted from reference light source 10 by means of a processor at computer system 11, and pertinent thermoluminescence curves are obtained.

Referring now to a method of thermoluminescence analysis according to the present invention. The method includes a step of extracting reference and analysed samples for thermoluminescence analysis. The extraction of samples may preferably include the steps of: (a) determining an area for sample analysis; (b) determining sampling points within and outside the area, the points arranged in a certain manner; (c) plotting the sampling points on a diagram; (d) extracting, packaging and marking analysed samples from the sampling points within the area; and (e) extracting, packaging and marking reference samples from the sampling points outside the area.

The strategy of extracting samples for analysis may be defined by the dimensions and shape of the area, and by the type and specifics of the problem being solved. The extracted samples may immediately be packaged in special containers wherein they are shielded from light. The containers may preferably be stored at a predetermined temperature, not subjected to artificial ionizing irradiation, until the analysis begins.

The samples may consist of fine fractions. Alternatively, the samples may consist of coarse fractions.

When the method is used for exploration of petroleum, natural gas or minerals, the samples are preferably collected as particles of hard rocks such as sand, earth and stones extracted from the subsurface which has not been subjected to anthropogenic action.

When the method is used for monitoring of environmental pollution, the samples are preferably collected as particles of hard rocks, such as sand, earth and stones, extracted from the upper soil layer.

The method further includes a step of performing thermoluminescence analysis for each sample, the analysis may preferably include the steps of (FIGS. 1–3): (a) mounting compartment 2 with sample 3 on heating element 1; heating sample 3 from an ambient temperature to an elevated temperature; and recording a thermoluminescence curve associated with the natural radioactivity background of sample 3; (b) irradiating sample 3 with a preferably predetermined dose of artificial ionizing irradiation by means of an irradiation element 20; and (c) mounting compartment 2 with sample 3 on heating element 1; heating sample 3 from an ambient temperature to an elevated temperature; and recording a thermoluminescence curve associated with the artificial ionizing irradiation.

Sample 3 may preferably be analysed in a pre-determined spectral range. The air in compartment is preferably replaced with a nitrogen or an inert gas. When sample 3 consists of a precious stone such as diamonds, thermoluminescence curves may preferably be taken in an oxygen-free medium such as an inert gas medium.

When sample 3 consists of coarse fractions, sample 3 is preferably weighed before heating, and the obtained thermoluminescence curves associated with the natural and artificial irradiation are preferably normalized to the mass value of sample 3. Compartment 2 may preferably be filled with a low melting point alloy, to improve thermal contact.

The method further includes a step of performing a comparative analysis of the obtained thermoluminescence curves, the analysis may preferably include the steps of: (a) comparing the thermoluminescence curves associated with the natural irradiation of the reference and the analysed samples; (b) comparing the thermoluminescence curves associated with the artificial irradiation of the reference and the analysed samples; (c) comparing the thermoluminescence curves associated with the natural and the artificial irradiation of the reference and analysed samples.

The method further includes a step of making a conclusion according to the results of the comparative analysis. The conclusion is preferably made according to the specific application of the method, and the problem being solved.

While the method is used for exploration of a substance, a conclusion is preferably made according to the following criteria: (a) when the thermoluminescence curves associated with the natural irradiation of the analysed samples substantially differ from those of the reference samples, a preliminary conclusion is preferably made on the presence of the substance explored for in the area; (b) when the thermoluminescence curves associated with the artificial irradiation of the analysed samples coincide with those associated with the natural irradiation, a final conclusion is preferably made on the presence of the substance explored for in the area.

A conclusion may further be made by using a computer library of reference thermoluminescence curves of samples collected from other areas having known features, according to the following criteria: when the thermoluminescence curves associated with the natural and artificial irradiation of the analysed samples coincide with reference thermoluminescence curves, a conclusion is preferably made that the type and amount of the substance explored for are identical to those associated with the reference thermoluminescence curves.

While the method is used for identification of objects, a conclusion is preferably made according to the following criteria: when the thermoluminescence curves associated with the artificial irradiation of the analysed samples coincide with those of the reference samples, a conclusion is preferably made that the samples belong to the same batch.

While the method is used for environmental monitoring, a conclusion is preferably made according to the following criteria: when the thermoluminescence curves associated with the natural and artificial irradiation of the analysed samples substantially differ from those of the reference samples, a conclusion is made on the presence of environmental pollution in the examined erea.

A conclusion may further be made by using a computer library of reference thermoluminescence curves of samples collected from other polluted areas having known features, according to the following criteria: when the thermoluminescence curves associated with the natural and artificial irradiation of the analysed samples coincide with reference thermoluminescence curves, a conclusion is preferably made that the type and mount of the polluter substance are identical to those associated with the reference thermoluminescence curves.

While the method is used for quality control, a conclusion is preferably made according to the following criteria: (a) when the thermoluminescence curves associated with the artificial irradiation of the analysed samples coincide with those of the reference samples, a conclusion is preferably made on the absence of impurity or structural defects in the analysed material; (b) when the thermoluminescence curves associated with the artificial irradiation of the analysed samples differ from those of the reference samples, a conclusion is preferably made on the presence of impurity or structural defects in the analysed material. The difference in the peak amplitudes of said thermoluminescence curves preferably indicates the level of the material cleaning.

A conclusion may further be made by using a computer library of reference thermoluminescence curves of samples collected from other materials having known origin of impurity or structural defects, according to the following criteria: when the thermoluminescence curves associated with the artificial irradiation of the analysed samples coincide with reference thermoluminescence curves, a conclusion is preferably made that the origin of impurity or structural defects is identical to that associated with the reference thermoluminescence curves.

Referring now to the examples, specific applications of a method of thermoluminescence comparative analysis according to the present invention are described (FIGS. 4–7).

EXAMPLE 1

Figure 4:
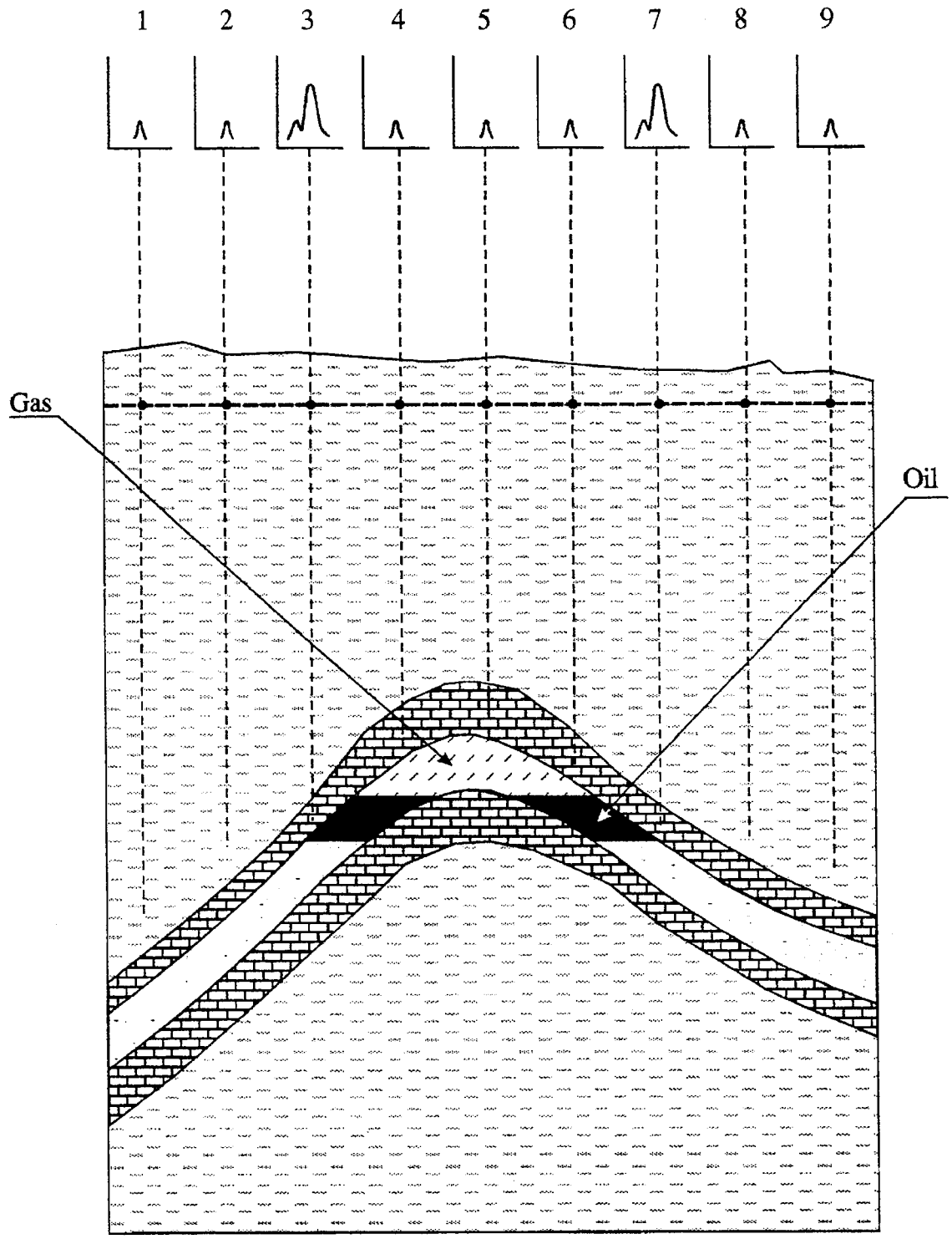
FIG. 4 shows the application of a thermoluminescence analysis method according to the present invention for exploration of petroleum, natural gas or minerals.

Petroleum and Natural Gas Exploration Using the Method of Thermoluminescence Comparative Analysis According to a geophysical prospect, in the area of potential petroleum, natural gas or minerals' bearing structures, the potential petroleum, natural gas or minerals rich areas are marked naturnow a geological map. Then a line is drawn intersecting the area and, depending on the area size, sampling points for analysis are plotted spaced at determined distances (FIG. 4). Then in the area, according to the geologic map, the samples for analysis are extracted from a specified deapth, where only those soil layers being selected that have not been subjected to anthropogenic action. The extracted samples are packaged in envelopes of light-tight material and the envelopes are marked with data including the sampling point number, sample number, extraction date, and extraction depth.

The samples are stored in a place shielded from light and radioactive irradiation at pre-determined temperatures until measurements are started.

Measurements are performed by means of a device shown in FIG. 1. To this purpose a light filter is first mounted, and the heating time of several minutes and pre-determined maximum heating temperature are set.

Sample 3 is (poured) into standard compartment 2, the redundant volume exceeding the height of the compartment upper edge being removed. Compartment 2 is mounted on heating element 1. The air in the system is then replaced by pure nitrogen whereafter the heating element is switched on and thermoluminescence, associated with the natural radioactivity background of analysed sample 3 is recorded.

All the remaining analysed samples are measured likewise.

The obtained data, stored in the data base of computer system 11, is processed under a special program which allows to establish, according to a certain criteria, the areas with anomalous values of thermoluminescence.

In case where such areas with anomalous thermoluminescence values are identified, a preliminary conclusion is made on the presence of petroleum, natural gas or minerals in the explored geological areas.

Then a repeated irradiation of the analysed samples is performed with the same dose of ionizing radiation and according to the above scheme thermoluminescence is repeatedly measured in the same samples. The measurements data is entered into the data base of computer system 11.

Then, under a special program, thermoluminescence curves, obtained by natural and artificial irradiation are compared, and, if the compared curves coincide with one another and with the geophysical prospect data, a conclusion is made on the presence of petroleum, natural gas or minerals, and a decision is taken to start exploration tasks.

EXAMPLE 2

Figure 5:
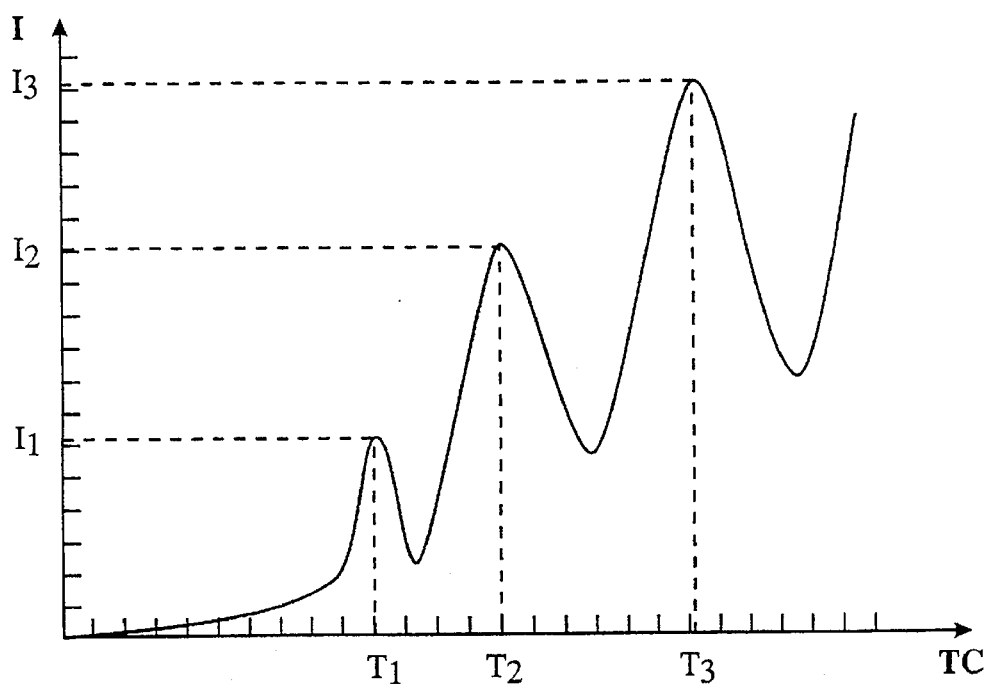
FIG. 5 shows the application of a thermoluminescence analysis method in forensic examination of objects.
Figure 5:
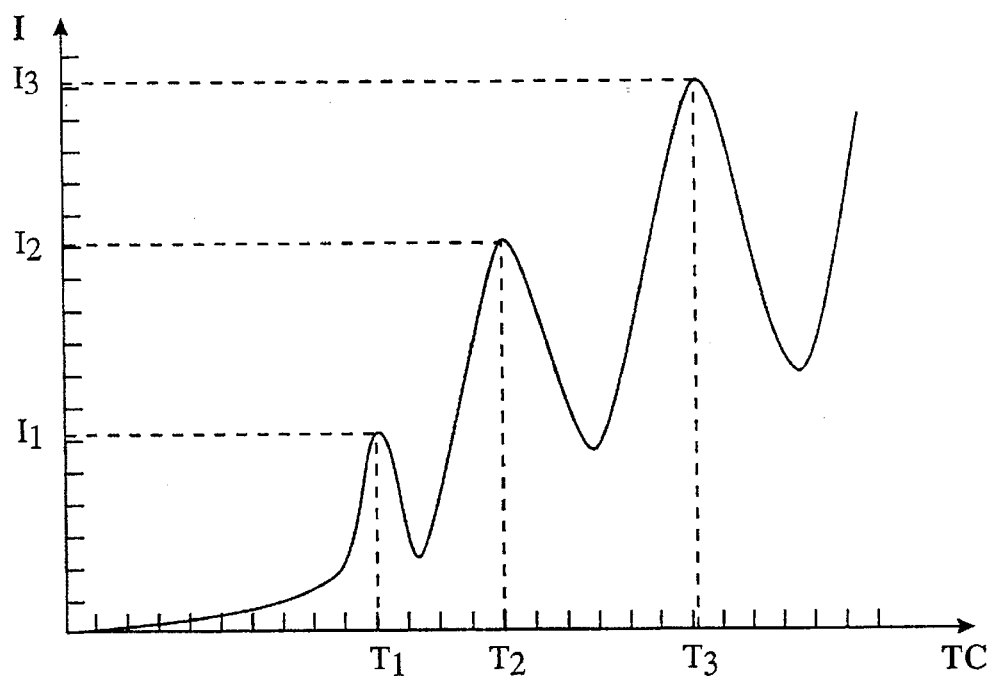
Figure 6:
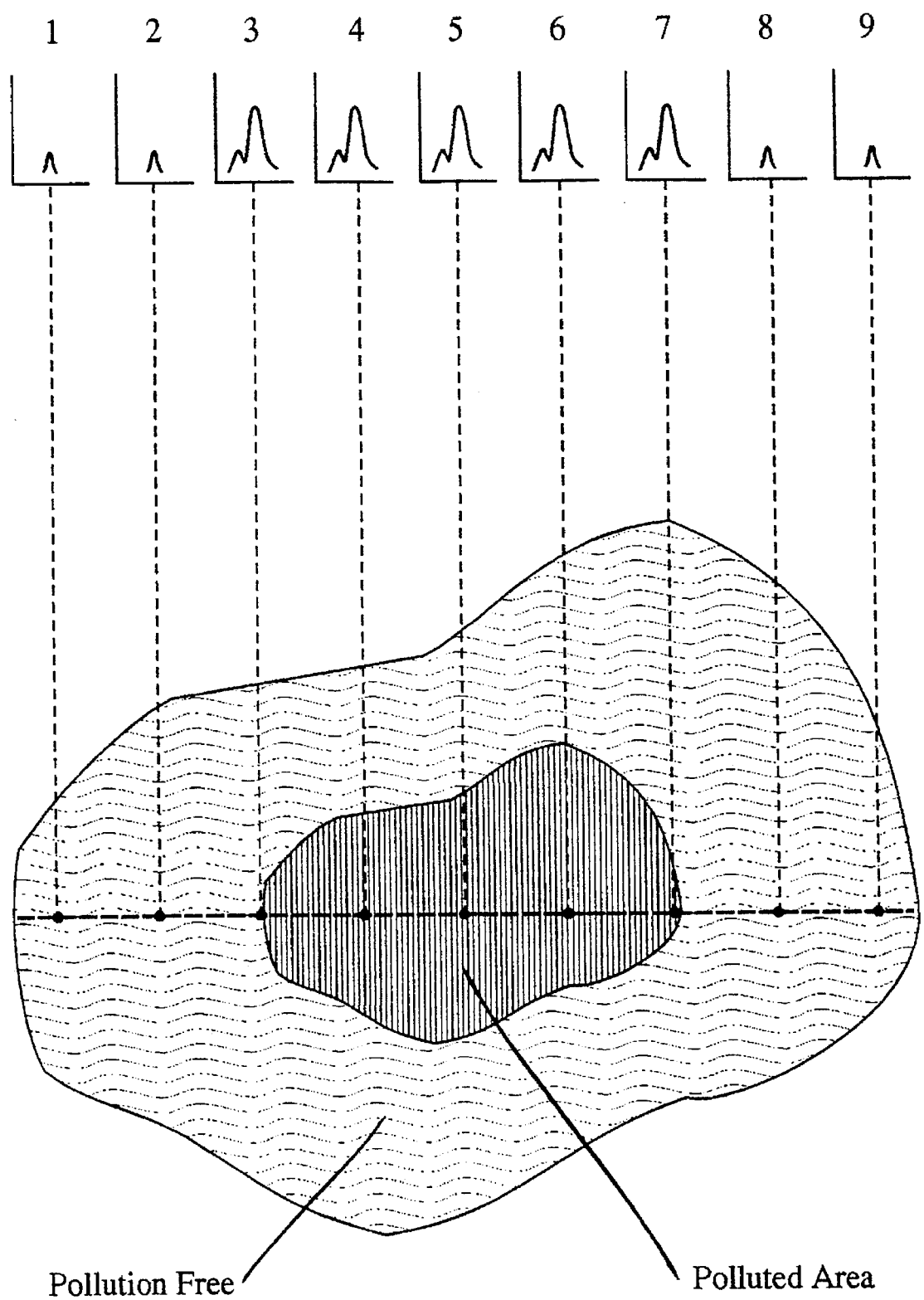
FIG. 6 shows the application of a thermoluminescence analysis method for environmental monitoring.

Forensic Examination of Materials, Substances and Articles Using the Method of Thermoluminescence Comparative Analysis As an illustration of this method the examination of fragments of a vehicle headlight diffusers collected at the scene or hot-and-run accident is described (FIG. 5).

On the accident scene the fragments of headlight diffusers are collected. They are packaged in light-tight envelopes and respectively marked.

In the suspect vehicle the fragments of light diffusers are collected which are likewise packaged and marked.

These samples are stored in a place shielded from light and radioactive radiation at a pre-determined temperature, until the measurements begin. Then the analyzed samples are weighed, and the weighing data is entered into a computer data base.

The measurements are performed by means of a device shown in FIG. 1. To this purpose a light filter is first installed, and the heating time and a pre-determined maximum heating temperature are set. Sample 3 is put (poured) into standard compartment 2 filled with a low melting point alloy. Compartment 2 is mounted on heating element 1.

Then heating element 1 is switched on, and the thermoluminescence, associated with the natural radioactivity background of analysed sample 3, is recorded. All the remaining samples are measured likewise.

Further, the samples are repeatedly irradiated with the same dose of ionizing irradiation and the samples' thermoluminescence is repeatedly measured according to the above scheme.

The measurements results are entered into the data base of computer system 11.

Thereafter, the obtained thermoluminescence curves are normalized to the sample mass value, and thermoluminescence curves, obtained by natural and artificial irradiation of the analysed and reference sample are compared (FIG. 5). When the compared curves coincide, a conclusion is made that the compared fragments are identical and belong to the same vehicle headlight diffuser.

EXAMPLE 3

Large Areas' Environmental Monitoring Using the Method of Thermoluminescence Comparative Analysis According to an information made available by the environment protection services, on the map of a region of supposed pollutions (FIG. 6), an area of supposed contamination is marked.

Then a line is drawn intersecting the area and, depending on the area dimensions, 25 points are plotted at pre-determined intervals for extraction of samples for analysis.

Further, samples for analysis are extracted from under the ground surface from the locations corresponding to the above plotted points.

The extracted samples are packaged in envelopes made of light-tight material and the envelopes are marked with data containing the sampling point number, sample number and extraction date.

Besides, the reference samples are extracted from regions located well beyond the supposedly polluted area.

The samples are also stored in a place shielded from light and radioactive radiation at pre-determined temperatures until measurements are started.

The measurements are performed by means of a device shown in FIG. 1. To this purpose a light filter is installed, and a pre-determined heating time and a maximum pre-determined heating temperature are set.

Sample 3 is put (poured) into standard compartment 2 and the redundant volume exceeding the height of the compartment upper edge is removed. Compartment 2 is mounted on heating element 1. The air in the system is then replaced in inlet gas or a nitrogen, and then heating element 1 is switched on and the thermoluminescence curve associated with the natural radioactivity background of analysed sample 3, is recorded.

All the remaining analysed and reference samples are measured likewise.

The obtained data, stored in the data base of computer system 11, is processed under a special program which allows, according to certain criteria, to determine areas with anomalous thermoluminescence values.

When areas with anomalous thermoluminescence values are identified, a preliminary conclusion is made on the pollution of the area.

Then the analysed and reference samples are repeatedly irradiated with the same dose of ionizing radiation, and the samples' thermoluminescence is repeatedly measured according to the above scheme. The measurements results are entered into the data base of computer system 11.

Further, under a special program, thermoluminescence curves obtained by natural and/or artificial irradiation, are compared and, based on the comparative analysis, a conclusion is made on the presence of pollution, and the precise boundaries of the polluted area are defined.

EXAMPLE 4

Figure 7:
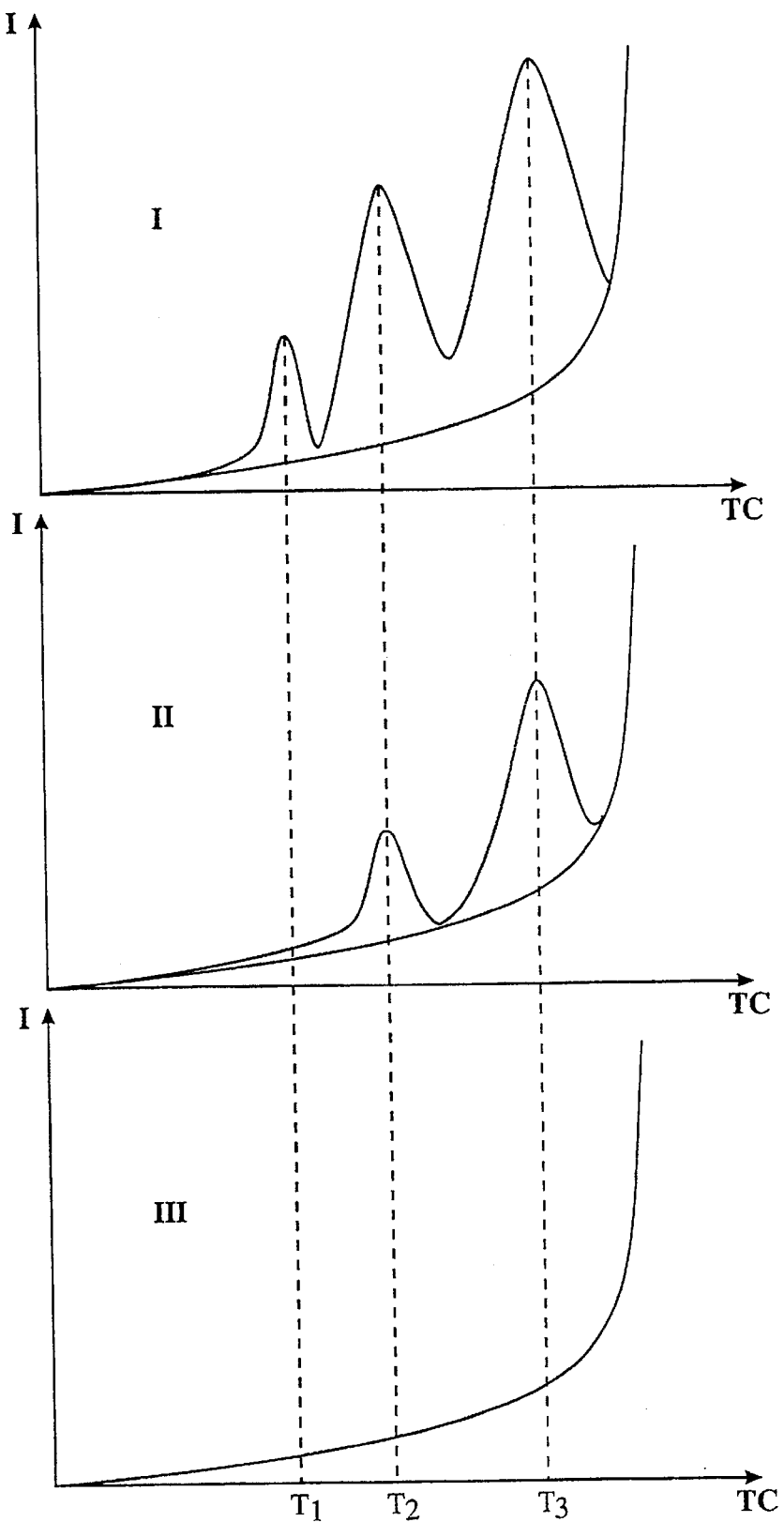
FIG. 7 shows the application of a thermoluminescence analysis method for quality control.

Production Quality Control Using the Method of Thermoluminescence Comparative Analysis By way of example let us consider the control of purity of a powder-like quartz (FIG. 7).

Samples of the analyzed material are collected and poured in envelopes made of light-tight material. Then the analyzed samples are irradiated by a pre-determined dose of ionizing radiation.

Measurements are performed by means of a device shown in FIG. 1. To this purpose a light filter is first installed, and a pre-determined heating time and a pre-determined maximum heating temperature are set.

Sample 3 is put (poured) into standard compartment 2.

Compartment 2 is mounted on heating element 1. Then heating element 1 is switched on and thermoluminescence is recorded. The measurement results are entered into the data base of computer system 11. During the material purification process, samples for analysis are continuously collected, irradiated with the same dose of ionizing radiation, and are analysed according to the above procedure. During the analysis the obtained thermoluminescence curves are continuously compared with the thermoluminescence curves of a standard reference sample, and the difference of peak amplitudes of the thermoluminescence curves in comparison with those of the standard reference sample material indicates the level of the material cleaning.

For a more detailed analysis of a substance cleaning degree the end product is irradiated with a large dose of ionizing radiation and analysed as mentioned above.

While the invention has been described with respect to a limited number of embodiments, it will be appreciated that many variations, modifications and other applications of the invention may be made.

What is claimed is:

1. A device for thermoluminescence analysis, comprising:
   (a) a heating element for heating a compartment with a sample;
   (b) an optical readout system for receiving light emitted by a sample;
   (c) a rotating disk for alternately chopping light emitted by a sample;
   (d) a reference light source for controlling said optical readout system by detecting light from said reference source;
   (e) a computer system for controlling the operation of said device and for data storage, retrieval and processing; and
   (f) compartments for housing samples.

2. A device as in claim 1, wherein said heating element includes a depression for mounting a compartment with a sample.

3. A device as in claim 1, wherein said heating element includes a thermocouple for controlling the level of heating.

4. A device as in claim 1, wherein said optical readout system includes a filter.

5. A device as in claim 1, wherein said optical readout system includes a photomultiplier.

6. A device as in claim 1, wherein said rotating disk includes an independent drive.

7. A device as in claim 1, wherein said rotating disk includes openings for passage of light emitted by a sample.

8. A device as in claim 5, wherein said rotating disk is positioned between said heating element and said photomultiplier.

9. A device as in claim 1, wherein said reference light source is positioned on said rotating disk.

10. A device as in claim 7, wherein said reference light source is positioned on said rotating disk between said openings.

11. A device as in claim 1, wherein said reference light source is positioned at the side of said rotating disk.

12. A device as in claim 11, wherein said rotating disk includes a means for transmitting light.

13. A device as in claim 12, wherein said means for transmitting light is a mirror.

14. A device as in claim 12, wherein said means for transmitting light is a fiber-optic system.

15. A device as in claim 1, wherein said computer system includes a convertor.

16. A device as in claim 15, wherein said computer system includes an optical convertor.

17. A device as in claim 1, wherein said compartments are of an identical emission spectrum.

18. A device as in claim 1, wherein said control of said optical readout system is done by periodic normalization of the intensity of light emitted by a sample to the intensity of light emitted by said reference light source.

19. A device as in claim 1, wherein said control of said optical readout system is done by continuous normalization of the intensity of light emitted by a sample to the intensity of light emitted by said reference light source.

20. A method of thermoluminescence analysis, comprising:
   (a) heating at least one analyzed sample and at least one reference sample placed within compartments and detecting light emitted from said samples;

(b) irradiating reference light from a reference light source and detecting said reference light;

(c) normalizing the intensity of said light emitted from said samples to the intensity of said reference light emitted by said reference light source; and (d) recording thermoluminescence curves for each of said at least one analyzed sample and said at least one reference sample.

21. A method as in claim 20, further including the steps of extracting samples, wherein said extraction includes:

(a) determining an area for sample analysis;

(b) determining sampling points within said area and sampling points outside said area;

(c) plotting said sampling points on a diagram;

(d) extracting, packaging and marking analysed samples from said sampling points within said area; and (e) extracting, packaging and marking reference samples from said sampling points outside said area.

22. A method as in claim 21, wherein said sampling points are arranged in a certain manner.

23. A method as in claim 21, wherein said samples, are packaged in containers immediately after being extracted.

24. A method as in claim 23, wherein said containers are opaque to light.

25. A method as in claim 24, wherein said containers are kept at a pre-determined temperature.

26. A method for exploration of petroleum, natural gas and minerals using a method of thermoluminescence analysis as in claim 21.

27. A method as in claim 26, wherein said area is determined according to geophysical prospect data.

28. A method as in claim 26, wherein said reference and analysed samples are collected as particles of sand, earth and stones extracted from the subsurface which has not been subjected to anthropogenic action.

29. A method for environmental monitoring, using a method of thermoluminescence analysis as in claim 21.

30. A method as in claim 29, wherein said reference and analysed samples are collected as particles of sand, earth and stones extracted from the upper soil layer.

31. A method as in claim 20, wherein said samples consist of fine fractions.

32. A method as in claim 20, wherein said samples consist of coarse fractions.

33. A method as in claim 32, wherein said compartments are filled with a low melting point alloy.

34. A method as in claim 32, wherein said samples are weighed before heating and said thermoluminescence curves are normalized to the mass value of said samples.

35. A method as in claim 20, wherein said samples are detected in a pre-determined spectral range.

36. A method as in claim 20, wherein the air in said compartments is replaced with a nitrogen gas.

37. A method as claimed in claim 20, wherein the air in said compartments is replaced with an inert gas.

38. The method of claim 20, further including the step of comparing said curves of said at least one analyzed sample with said curves of said at least one reference sample.

39. A method as in claim 38, wherein said method is used for exploration of a substance, and wherein said method further includes a step of making a conclusion, said conclusion being made according to the following criteria: when said thermoluminescence curves of said at least one analysed sample substantially differ from said thermoluminescence curves of said at least one reference sample, a conclusion is made on the presence of the substance explored for in an area.

40. A method as in claim 39, wherein said conclusion is further made by using a computer library of reference thermoluminescence curves of samples collected from areas having known features, according to the following criteria: when said thermoluminescence curves of said at least one analysed sample coincide with at least one reference thermoluminescence curve, a conclusion is made on the type and amount of the substance explored for.

41. A method as in claim 38, wherein said method is used for identification of an object, and wherein said method further includes a step of making a conclusion, said conclusion being made according to the following criteria: when said thermoluminescence curves of said at least one analysed sample coincide with said thermoluminescence curves of said at least one reference sample, a conclusion is made that said at least one analysed sample and said at least one reference sample belong to the same batch.

42. The method of claim 20, wherein said thermoluminescence curves are associated with a natural radiation of said samples.

43. The method of claim 42, further including the steps of:

(a) irradiating each of said at least one analyzed sample and at least one reference sample with a dose of artificial ionizing radiation;

(b) heating said at least one analyzed sample and at least one reference sample and detecting light emitted from said samples; and irradiating reference light from said reference light source and detecting said reference light;

(c) normalizing the intensity of light emitted from said samples to the intensity of light emitted by said reference light source;

(d) recording thermoluminescence curves associated with said artificial radiation of said samples.

44. The method of claim 43, further including the step of comparing said curves of said at least one analyzed sample with said curves of said at least one reference sample.

45. A method for exploration of petroleum, natural gas, and minerals, using a method of thermoluminescence analysis as in claim 44.

46. A method as in claim 45, wherein said method further includes a step of making a conclusion, said conclusion is made according to the following criteria:

(a) when said thermoluminescence curves associated with said natural irradiation of said at least one analysed sample substantially differ from said thermoluminescence curves associated with said natural irradiation of said at least one reference sample, a preliminary conclusion is made on the presence of the substance explored for in an area (b) when said thermoluminescence curves associated with said artificial irradiation coincide with said thermoluminescence curves associated with said natural irradiation of said at least one analysed sample and with geophysical prospect data, a final conclusion is made on the presence of the substance explored for in an area.

47. A method as in claim 46, wherein said conclusion is further made by using a computer library of reference thermoluminescence curves of samples collected from areas having known features, according to the following criteria: when said thermoluminescence curves associated with said natural and artificial irradiation of said at least one analysed sample coincide with at least one reference thermoluminescence curve, a conclusion is made on the types and amounts of petroleum, natural gas and minerals explored for.

48. A method for forensic identification of objects, using a method of thermoluminescence analysis as in claim 44.

49. A method as in claim 48, wherein said samples include a precious stone and the air in said compartments is replaced with an inert gas.

50. A method as in claim 48, wherein said method further includes a step of making a conclusion, said conclusion being made according to the following criteria:
  (a) when said thermoluminescence curves associated with said natural irradiation of said at least one analysed sample coincide with said thermoluminescence curves associated with said natural irradiation of said at least one reference sample, a preliminary conclusion is made that said at least one analysed sample and said at least one reference sample belong to the same batch
  (b) when said thermoluminescence curves associated with said artificial irradiation of said at least one analysed sample coincide with said thermoluminescence curves associated with said artificial irradiation of said at least one reference sample, a final conclusion is made that said at least one analysed sample and said at least one reference sample belong to the same batch.

51. A method for environmental monitoring, using a method of thermoluminescence analysis as in claim 44.

52. A method as in claim 51, wherein said method further includes a step of making a conclusion, said conclusion being made according to the following criteria:
  (a) when said thermoluminescence curves associated with said natural irradiation of said at least one analysed sample substantially differ from said thermoluminescence curves associated with said natural irradiation of said at least one reference sample, a conclusion is made on the presence of environmental pollution in an area
  (b) when said thermoluminescence curves associated with said artificial irradiation of said at least one analysed sample substantially differ from said thermoluminescence curves associated with said artificial irradiation of said at least one reference sample, a conclusion is made on the presence of environmental pollution in said area, and the precise boundaries of the polluted area are defined.

53. A method as in claim 52, wherein said conclusion is further made by using a computer library of reference thermoluminescence curves of samples collected from polluted areas having known features, according to the following criteria: when said thermoluminescence curves associated with said natural and artificial irradiation of said at least one analysed sample coincide with reference thermoluminescence curves, a conclusion is made on the type and amount of the polluter substance.

54. A method for quality control, using a method of thermoluminescence analysis as in claim 44.

55. A method as in claim 54, wherein said at least one reference sample is standard.

56. A method as in claim 54, wherein said method further includes a step of making a conclusion, said conclusion being made according to the following criteria:
  when said thermoluminescence curves associated with said artificial irradiation of said at least one analysed sample coincide with said thermoluminescence curves associated with said artificial irradiation of said at least one reference sample, a conclusion is made on the absence of impurity in the analysed material.

57. A method as in claim 56, wherein said conclusion is further made by using a computer library of reference thermoluminescence curves of samples collected from materials having known origin of impurity, according to the following criteria: when said thermoluminescence curves associated with said artificial irradiation of said at least one analysed sample coincide with at least one reference thermoluminescence curve, a conclusion is made on the origin of impurity.

58. A method as in claim 54, wherein said method further includes a step of making a conclusion, said conclusion being made according to the following criteria:
  when said thermoluminescence curves associated with said artificial irradiation of said at least one analysed sample coincide with said thermoluminescence curves associated with said artificial irradiation of said at least one reference sample, a conclusion is made on the absence of structural defects in the analysed material.

59. A method as in claim 58, wherein said conclusion is further made by using a computer library of reference thermoluminescence curves of samples collected from materials having known origin of structural defects, according to the following criteria: when said thermoluminescence curves associated with said artificial irradiation of said at least one analysed sample coincide with at least one reference thermoluminescence curve, a conclusion is made on the origin of structural defects.

60. The method of claim 43, further including the step of comparing said curves associated with said natural radiation with said curves associated with said artificial radiation.

61. A method as in claim 60, wherein said method is used for exploration of a substance, and wherein said method further includes a step of making a conclusion, said conclusion being made according to the following criteria:
  (a) when said thermoluminescence curves associated with said natural irradiation of said at least one analysed sample substantially differ from said thermoluminescence curves associated with said natural irradiation of said at least one reference sample, a preliminary conclusion is made on the presence of the substance explored for in an area;
  (b) when said thermoluminescence curves associated with said artificial irradiation coincide with said thermoluminescence curves associated with said natural irradiation of said at least one analysed sample, a final conclusion is made on the presence of the substance explored for in said area.

62. A method as in claim 61, wherein said conclusion is further made by using a computer library of reference thermoluminescence curves of samples collected from areas having known features, according to the following criteria: when said thermoluminescence curves associated with said natural and artificial irradiation of said at least one analysed sample coincide with at least one reference thermoluminescence curve, a conclusion is made on the type and amount of the substance explored for.

63. The method of claim 20, further including a step of irradiating each of said at least one analyzed sample and at least one reference sample with a dose of artificial ionizing radiation before the step of heating said samples, and wherein said thermoluminescence curves are associated with said artificial radiation.

64. The method of claim 63, further including the step of comparing said curves of said at least one analyzed sample with said curves of said at least one reference sample.

65. A method as in claim 63, wherein said dose of ionizing radiation is pre-determined.

66. A method of thermoluminescence analysis, comprising:
  (a) heating a compartment with a sample and detecting light emitted from said sample;
  (b) irradiating reference light from a reference light source and detecting said reference light;
  (c) normalizing the intensity of said light emitted from said sample to the intensity of said reference light emitted by said reference light source; and
  (d) recording a thermoluminescence curve.

* * * * *